June 15, 1926.
B. U. HILLS
OIL LEVEL GAUGE
Filed March 18, 1922
1,588,889
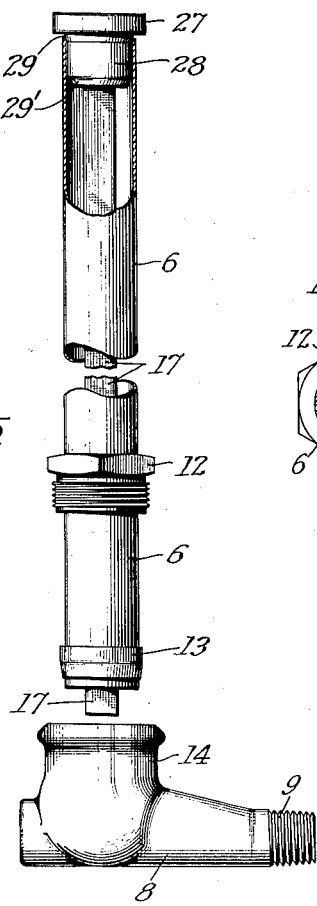

Patented June 15, 1926.

1,588,889

UNITED STATES PATENT OFFICE.

BURTON U. HILLS, OF CHICAGO, ILLINOIS.

OIL-LEVEL GAUGE.

Application filed March 18, 1922. Serial No. 544,793.

My invention belongs to that general class of devices known as gauges or measuring apparatus, and relates particularly to a simple type of gauge particularly adapted for use on a well known type of automobile for determining the amount of lubricating oil in the crank case of the engine.

The invention has among its objects the production of a device of the kind described that is simple, compact, durable, efficient, reliable, convenient and satisfactory for use wherever found applicable. More particularly it has as an object the production of a reliable gauge or measuring device which may be easily and conveniently installed, and which will at all times provide means for quickly and accurately determining the amount of oil in the crank case without requiring reaching under the car to manipulate any pet-cocks, which is not only inconvenient, but also is generally the occasion for soiling the hands or wearing apparel, and as a result the oil level is not given the attention that it should have. The preferred form of device illustrated is such that it consists of few parts, is noiseless and free from vibration, and in every way foolproof. Many other objects and advantages of the construction herein shown and described will be obvious to those skilled in the art from the disclosure herein given.

To this end my invention consists in the novel construction, arrangement and combination of parts herein shown and described, and more particularly pointed out in the claim.

In the drawings, wherein like reference characters indicate like or corresponding parts:—

Fig. 1 is a view in elevation of my device as it appears when installed, a portion of the automobile and engine being shown in dotted lines;

Fig. 2 is a sectional view through the device;

Fig. 3 is a view in elevation, with a portion cut away to show the construction;

Fig. 4 is substantially a sectional view on line 4—4 of Fig. 2, and

Fig. 5 is a view partly in elevation and with portions broken away, the elements shown partly disassembled.

Referring to the drawings, and particularly Fig. 1, 1 represents a portion of the engine carried by the usual brackets 2 from the frame 3, forming a part of the chassis. I have also shown a portion of the apron 4 and running board of fender 5. My device includes a tube 6 connected at one end of the crank case, with the outer end extended through the apron 4, and it may be mentioned that a bushing or sleeve 7 may be provided, as shown, which provides a bearing for the outer end of the tube. The tube 6 is connected with the fitting 8, preferably arranged, as at 9, for threaded engagement with the crank case, taking the place of the usual pet-cock. However, I generally prefer to provide a pet-cock 10 on the fitting 8. I have also shown in Fig. 1 the pet-cock 11 which is at a higher level, ordinarily this being placed at the normal level of the oil in the crank case. I have indicated the oil level as at L, but generally the level is satisfactory if at some point between the two pet-cock openings, it being preferred, however, that it be substantially at the level of the upper opening at which the pet-cock 11 is located.

The tube 6 may be secured to the fitting 8 in any preferred manner, preferably substantially as shown, in which case the fitting is provided with the threaded part 14 into which the tube 6 projects, 12 being a nut and 13 a compression ring which will tightly grip the tube when the nut 12 is turned down. Where the tube 6 is of a ductile metal, the ring 13 may be contracted sufficient to slightly indent or corrugate the pipe, as indicated at 15. This particular construction, however, in itself forms the subject matter of a separate application and need not be described in detail herein.

Arranged within the tube 6 and removable therefrom, is a rod or bar 17 upon which I prefer to provide suitable gradations 18, 19, 20, 21 and 22 or the equivalent. There may also be marked thereon the words "Low", "O. K." and "Too much", or their equivalents, or any other identifying marks to indicate desired information. As will be noted, the tube 6 is sufficiently large or the rod is sufficiently small so that they are not a close fit. Generally, I prefer to provide means for preventing the rod from touching the walls of the tube so that there will be no rattle or vibration. As shown, a resilient member 23 is secured to the rod, in the case illustrated by extending the same through the opening 14, a link or ring 25 being arranged over the free ends. The member 23, which is preferably of resilient material, engages the walls of the tube 6 and maintains the rod 17 centrally therein, but in such manner that it will not vibrate or be noisy. This construction also permits the easy withdrawal of the rod. At the outer end of the rod I prefer to provide a head 27, by means of which the rod may be grasped and withdrawn from the tube. In this connection, I prefer to provide an inwardly projecting part 28 which has a slight flare at 29 which will cause the part to tightly fit the interior of the tube when fully seated, and yet permit its ready removal or insertion. The inner end may be tapered as at 29' to permit its being easily and quickly inserted in the tube. By making the same as shown, while it tightly fits the tube and may even slightly expand the tube, so as to be retained in place, and yet there is not enough bearing to cause trouble in seating the same or withdrawing it from the tube.

In use, assuming that the device is installed substantially as shown in Fig. 1, or in any equivalent manner; the amount of oil in the crank case or other receptacle, depending upon the use to which the device is put, may be readily and accurately determined by withdrawing the rod from the tube and noting the height of the liquid in the tube as indicated by its mark on the rod. If it extends to the gradation 20, it shows that the oil lever is "O. K." or normal, and satisfactory for the most efficient running. If it is above, as for example at 21, it indicates that there is "Too much" oil in the crank case and some should be drained off. On the other hand, if the oil only reaches a portion of the rod below the gradation 20, for example 18, or does not indicate at all, then it may be readily noted that there is an insufficient quantity of oil in the crank case and that more should be added to prevent injury to the mechanisms. It will be particularly noted that with this construction, where the same is installed as shown or in substantially this manner, the rod may be grasped conveniently from the outside of the car and without even raising the hood. It is not necessary to crawl under the car or to reach under, thereby soiling the hands or clothing, as is generally the case where the oil level is determined by manipulating the pet-cocks. It also enables the operator to determine the level accurately and without guess work, as in the case where only the pet-cocks are used, only the high and low levels can be conveniently ascertained. In this connection with only pet-cocks it will be noted that the operator might observe that the oil was above the low level, and carelessly relying on this, start off on a trip and when after a few miles the oil has dropped below the low level. Relying on his previous observation this would not be immediately obvious to him. With my improved gauge, however, he may determine to a nicety just how much oil is needed and add just enough to bring the same up to the normal level.

While I have particularly referred to the device as applicable for use in connection with a well known type of automobile engine, obviously the apparatus may be used wherever found applicable, and may be modified in size, shape or materials to meet the particular installation.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

In a device of the kind described and in combination, a chambered fitting constructed for attachment to a reservoir and communicating therewith, a tube carried by and communicating with the chamber in said fitting, a rod projecting into said tube from the open end to a point adjacent said fitting, means for removably securing said rod in the tube and closing the open end of the tube, means for centering the inner end of the rod in the tube and preventing transverse play thereof in the tube, comprising a resilient wire extending transversely through the rod and bent lengthwise thereof, and means for connecting the free ends of the wire to the rod.

In testimony whereof, I have hereunto signed my name.

BURTON U. HILLS.